United States Patent [19]

Howell

[11] 3,969,923

[45] July 20, 1976

[54] LEAK DETECTOR

[75] Inventor: Jack M. Howell, Lighthouse Point, Fla.

[73] Assignee: Valcor Engineering Corporation, Kenilworth, N.J.

[22] Filed: Aug. 29, 1975

[21] Appl. No.: 608,826

[52] U.S. Cl............................. 73/40.5 R; 340/242
[51] Int. Cl.².................... G01M 3/28; F17D 3/04
[58] Field of Search................. 73/40, 40.5 R, 49.1, 73/49.5; 340/242

[56] References Cited
UNITED STATES PATENTS

| 2,952,389 | 9/1960 | Fowler et al............................ | 73/40 |
|---|---|---|---|
| 3,788,127 | 1/1974 | Marsh..................................... | 73/40 |
| 3,817,087 | 6/1974 | Mooney.............................. | 73/40.5 R |

Primary Examiner—Richard C. Queisser
Assistant Examiner—Joseph W. Roskos
Attorney, Agent, or Firm—Darby & Darby

[57] ABSTRACT

A detector for sensing and signalling leakage in a closed fluid system, the detector having inlet and outlet passages connected by parallel main and secondary channels. The main channel is provided with normally closed sealing means to prevent communication between the inlet and outlet passages, and the secondary channel is provided with an element that moves in response to a pressure differential across the secondary channel. The main channel sealing means opens in response to a threshold differential pressure between the inlet and outlet passages, the threshold for the main channel being high to allow flow only when fluid is intentionally passed through the detector. The threshold for the secondary channel is low to permit movement upon pressure differentials caused by leaks, the secondary channel movable means having magnetic flux associated with it to actuate reed switch when this means is moved by a pressure differential across the secondary channel.

7 Claims, 2 Drawing Figures

LEAK DETECTOR

BACKGROUND OF THE INVENTION

Potentially harmful fluids in both gaseous and liquid form are often transmitted by pipelines from sources to distribution points and ultimately to areas where they are extracted from the pipeline for consumption. This type of distribution system is, for example, widely used in transporting fuels such as oil, natural gas, and gasoline. Pipelines used in fuel transmission are often located underground and otherwise inaccessible areas and therefore cannot be visually monitored. Because of the highly combustible nature of these fluids and their noxious characteristics, it is essential that leaks which develop in such transmission systems be detected at the earliest possible moment.

Such pipelines are commonly used in areas occupied by consumers and other members of the general public such as in gasoline service stations wherein gasoline is stored underground and pumped to pipelines for insertion into the fuel tanks of automobiles. The dangers of explosion and air/ground pollution have necessitated a device that can be installed in proximity to a pipeline system and which will automatically signal even very small leakage through pipeline connections, fittings, valves or other control components.

While the value of this invention is readily apparent from its application in such fuel transmission systems, it should be equally clear that it can be used in and with other fluid (liquid or gas) systems where it is important to promptly and accurately detect and signal leaks that are very small compared to the normal flow through such systems.

SUMMARY OF THE INVENTION

The above-described need for a leak detector is satisfied by the instant invention which can be inserted in a system to sense a pressure differential across the device caused by leakage downstream of the device. More specifically, the leak detector includes a housing having inlet and outlet passages which connect into the system. Two parallel channels are formed in the leak detector housing connecting the inlet and outlet passages. The first of the two channels, which is referred to as the main channel, has a valve sealing means biased toward a closed position, which bias is overcome by the pressure differential across the valve when a valve or other control means is opened downstream to intentionally permit fluid flow through the main channel.

The secondary channel has movably disposed in it a piston, diaphragm or other pressure responsive movable element containing a source of magnetic flux. This movable element is normally urged toward one position by either gravity, a spring, hydraulic, or other such force. This force is overcome by even very slight pressure differentials across the secondary channel such as those caused by very minimal or slow leaks downstream of the device.

Upon occurrence of such pressure differentials, the piston, diaphragm or other element is moved in the secondary channel and thereby magnetic flux from the moved element is sensed by a reed switch which is mounted in the detector housing. The magnetic flux actuates the reed switch providing a warning indication whenever fluid is intentionally passed through the detector, but more importantly, also when fluid unintentionally passes through due to a leak existing downstream of the detector. The reed switch may be used to actuate an external alarm means to warn of fluid leakage.

It is therefore an object of the invention to provide a leak delector which can be connected to a closed fluid system to automatically sense and signal leakage which is very small compared to the flow normally passing through the system.

Another object of the invention is to provide a leak detector that will sense fluid leakage anywhere downstream of the detector.

Still another object of the invention is to provide a leak detector which will actuate an electrical warning device upon occurrence of fluid leakage.

A further object of the invention is to provide a leakage detector wherein the threshold leakage rate required to actuate an alarm may be altered.

Other and further objects of the invention will be apparent from the following drawings and description of two preferred embodiments in which like reference numerals are used to indicate like parts in the various views.

DESCRIPTION OF THE PREFERRED EMBODIMENTS

Figure 1:
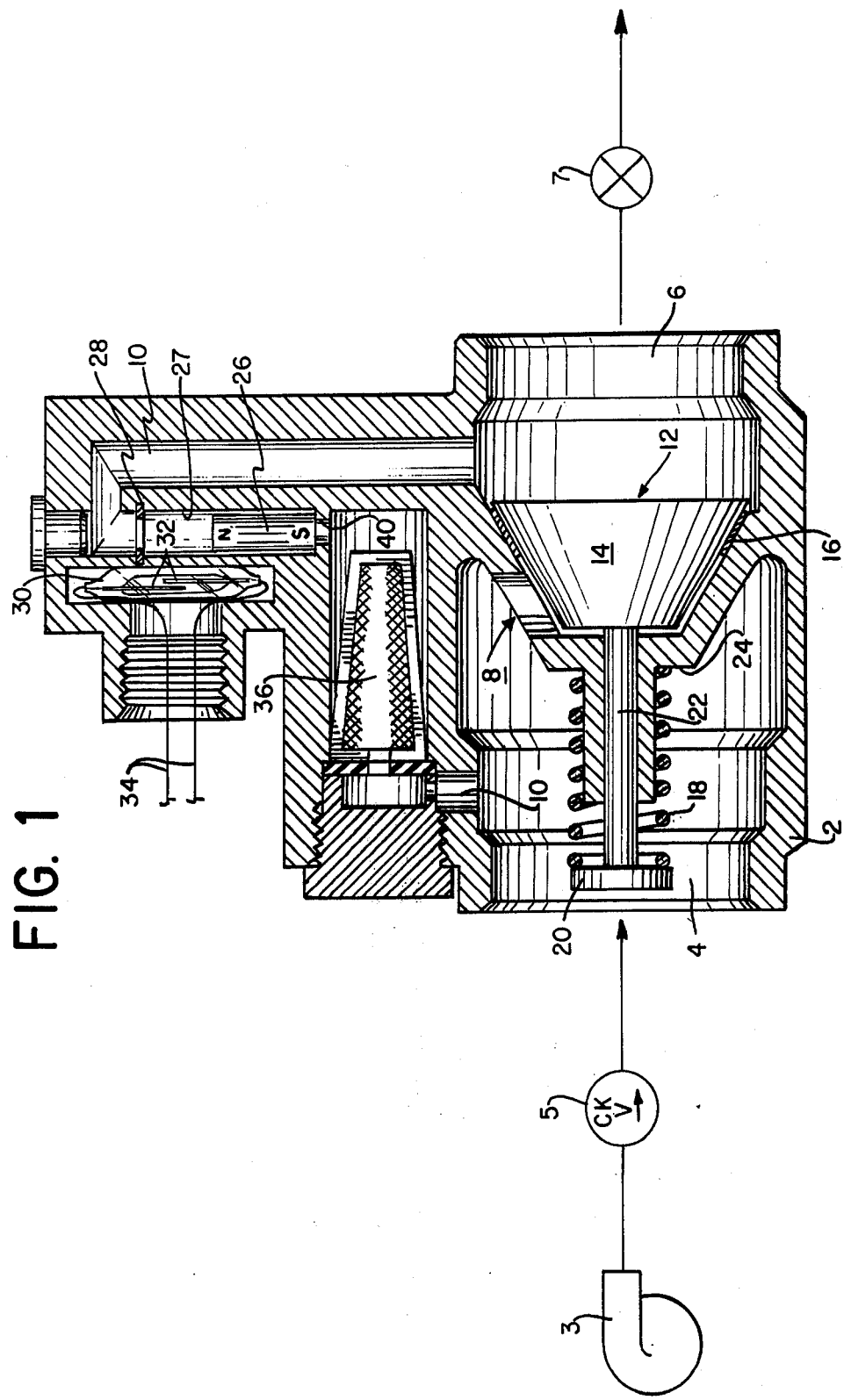
FIG. 1 is a sectional side elevation of a first embodiment of the leak detector.

Referring now to FIG. 1 of the drawings, one form of a leak detector according to my invention includes a housing 2 having an inlet 4 and outlet 6. The inlet 4 and outlet 6 are incorporated in a closed system schematically shown to contain a pump 3, check means 5 upstream of the detector and a control means 7. Fluid flow is therefore from the pump 3 to the control means 7, through check means 5 and the leak detector herein disclosed.

Referring again to housing 2, communication between the inlet 4 and outlet 6 is provided by two separate channels, namely the main channel 8 and the secondary channel 10 formed in the housing 2.

A poppet valve 12 is disposed in main channel 8 and has a plunger sealing means 14 normally urged into contact with a valve seat restriction 16 by a spring 18. The spring 18 is disposed between a flange 20 at the end of a shaft 22 connected to the poppet valve plunger 14 and a shoulder 24 interior to the housing 2.

Disposed in secondary channel 10 is a movable element, which in this embodiment is a magnetic sensor piston 26. The diameter of the piston 26 is less than the diameter of bore 27 in the housing 2, thereby permitting fluid flow through secondary channel 10 about the piston 26. The pressure differential created by the flow of fluid through channel 10 between the piston 26 and bore 27 is sufficient to move piston 26 upwardly within bore 27 toward a stop 28. The stop 28 may comprise a ring disposed in bore 27 of the channel 10 or may include one or more projections protruding into the bore of the channel 10. It is only necessary that the stop serve to halt travel of the piston 26 while permitting fluid flow to be maintained through the channel 10 into the outlet passage 6.

By properly dimensioning the cross-sectional area of the piston 26 with respect to bore 27 of the channel 10, and by controlling the weight of the piston 26, upward movement of the piston 26 may be achieved upon existence of precisely defined and very low threshold pressure differentials across secondary channel 10. Such thresholds are low enough to reflect even very small leaks downstream of the detector.

Disposed in one of the housing walls is a reed switch 30 comprising normally open overlapping reeds 32 connected to respective external wires 34. As the piston 26 moves upward during existence of a differential pressure condition across it, a leakage magnetic flux is imparted to the reeds 32 causing their mutual attraction and completion of a circuit between the wires 34. An external electrical alarm device (not shown) can be connected to wires 34 to signal upward movement of the piston 26.

To prevent accumulation of contaminants in the region adjacent the magnetic sensor piston 26 which might degrade its operation, a filter 36 is positioned in the channel 10 upstream of the piston 26. The filter 36 removes contaminants from the fluid before they reach the piston 26.

In operation, the section of a pipeline downstream of the check means 5 is connected to the inlet 4 of the leak detector, and the outlet 6 is connected to downstream side of the pipeline leading to the control means 7. When there is no fluid flowing through the system and there is no leak in that system, the spring loaded poppet valve 12 in the main channel 8 is closed, the plunger 14 being seated on the valve seat 16 by the spring 18. At this time, the magnetic sensor piston 26 is maintained by gravity in a fully downward position, and the reed switch 30 is open.

when control means 7 opens and fluid is normally pumped into the outlet passage 4 of the leak detector, the pressure in the inlet passage 4 increases relative to that in the outlet passage 6 thereby creating a pressure differential across the valve seat restriction 16. This pressure differential results in a pressure force on the spring 18. When this pressure differential exerts a force on the plunger 14 in excess of the opposing force of spring 18, plunger 14 is lifted from the valve seat restriction 16, thereby permitting fluid flow through the main channel 8 from the inlet passage 4 to the outlet passage 6.

This pressure differential between the inlet passage 4 and outlet passage 6 during normal fluid pumping also results in a bypass flow through the secondary channel 10. As a result of the pressure differential between the inlet and outlet passages fluid flows through the filter 36. The pressure differential further results in a net force applied to the underside of the piston 26 as the fluid flows through the constricted passage about the piston 26 and out through the outlet passage 6. The pressure on the underside of the piston 26 causes the piston 26 to be lifted upwardly toward the stop 28.

In its upward position, the magnetic piston 26 imparts a flux to the reeds 32 of the reed switch 30 causing them to make contact thereby completing a circuit between the wires 34. An electrical signal or alarm can be connected to an electrical power source (both not shown) via the circuit 34, the alarm actuating when the reed switch 30 is closed. At this time, the alarm signal is not considered ominous since it is known that fluid is being deliberately pumped through the pipeline and the detector. (Alternatively relays, not shown, can be employed to shunt the signal in this normal situation.)

When a control component such as a valve 7 downstream of the leak detector is closed, fluid flow through the leak detector may be expected to cease. At this time, under normal conditions, the pressures in the inlet passage 4 and outlet passage 6 are equalized and hence there are no pressure differentials across channels 8 and 10. The piston 14 of the poppet valve 12 therefore is again seated on the restriction 16 urged by the force of the spring 18 against the flange 20. Also, the sensor piston 26 is returned by gravity to its lower position wherein it may be supported by rest point(s) 40 formed in the housing walls or constructed in a manner similar to the stop 28. When the piston 26 is in its lower position, the reed switch 30 opens and the signal generated by the alarm or indicator connected to it is interrupted, indicating no fluid flow through the leak detector.

Should there be a leak in the pipeline downstream of the leak detector after the valve 7 is closed, a small pressure differential will exist between the inlet passage 4 and outlet passage 6. In the case of very small leaks, this pressure differential will be insufficient to overcome the threshold force required to urge the poppet 14 from its position seated on the restriction 16 against the force of the spring 18 and the poppet valve will remain closed, preventing massive fluid flow through the leak detector. However, the slight differential pressure created by the leak between inlet passage 4 and outlet passage 6 will be sufficient to create a force against the underside of the sensor piston 26 thereby raising the piston 26 to its position against the stop 28 at which time the flux imparted by the magnet contained in the piston 26 will actuate the reed switch 30 and alarm connected to it. Sounding of the alarm when fluid is not being pumped through the leak detector indicates the presence of a leak in the system downstream of the leak detector. By providing separate signals for each of several leak detectors distributed along the pipeline, the location of the leak may be isolated between the adjacent detectors.

Figure 2:
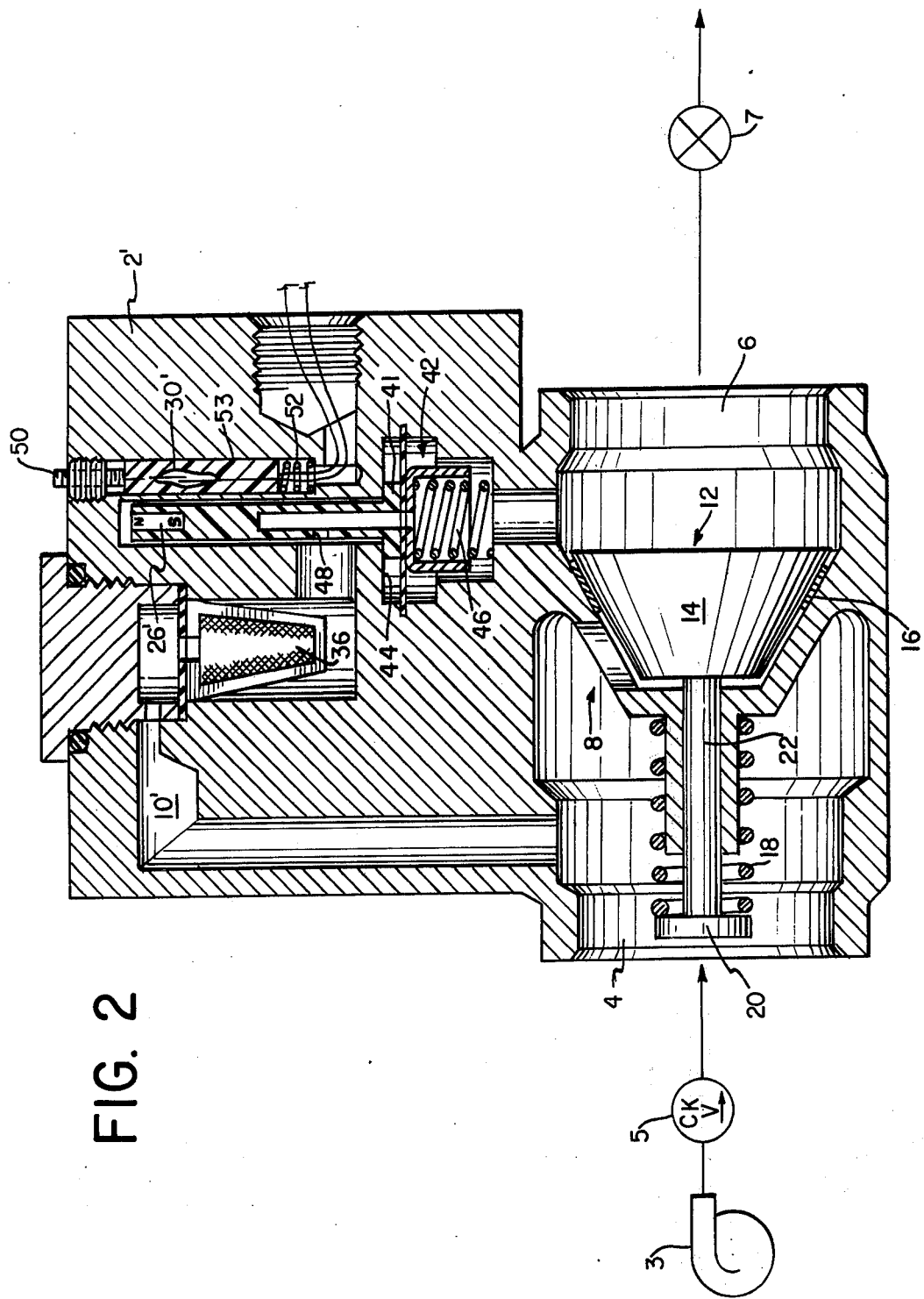
FIG. 2 is a sectional side elevation of a second embodiment of the leak detector.

Referring now to FIG. 2 of the drawings, the gravity actuated sensor piston 26 of FIG. 1 is replaced by diaphragm assembly 42 having an upper magnetic element 26' and a shoulder section 41. Assembly 42 is normally urged upward so that the shoulder 41 abuts a wall 44 on the housing 2' by a spring 46. Assembly 42 is provided with an opening 48 which permits secondary flow of fluid through the channel 10' to the outlet passage 6. The diaphragm assembly 42 is also apertured to permit through flow of fluid from the inlet passage 4 to the channel 10' and out through the outlet passage 6.

During normal fluid flow and under leakage conditions, a pressure differential is established across the diaphragm 42 urging the diaphragm 42 and magnet 26' connected to it downward against the force of the relatively weak spring 46. Downward movement of the magnet 26' into axial proximity with the reed switch 30' causes switch 30' to close, completing a circuit to an external alarm. When normal fluid flow is cut off and there are no leaks downstream of the leak detector, the pressures on both sides of the diaphragm 42 are equal and the force exerted by the relatively weak spring 46 is sufficient to urge the diaphragm 42 and magnet 26' upward against the housing wall 44, thereby causing the reed switch 30' to open.

Operation of this embodiment is essentially the same as that described above relative to the embodiment illustrated in FIG. 1. Further description of the operation is therefore deemed unnecessary, since such operation will be understood by those skilled in the art.

Sensitivity of the leak detector may be controlled by choice of suitable dimensions for the sensing pistons 26 and 26' and diaphragm 42, and the bores of channels 10 and 10'. Sensitivity may be further controlled by choice of a spring constant for the spring 46 and materials for the pistons 26 and 26' to achieve a desired weight.

In order to provide for more precise control and variation of sensitivity of a given leak detector without modification of component dimensions or materials, means are provided to alter the axial position of the reed switch 30' relative to the travel path in channel 10' of sensing piston 26'. A screw mechanism 50 is affixed to the reed switch 30' and threaded through an opening in a rigid member affixed to or part of the housing 2'. A spring 52 disposed in a channel 53 wherein the reed switch 30 is slidably mounted, urges the reed switch 30' upwardly against the bottom of the screw mechanism 50. As the screw 50 is rotated, it moves upward or downward depending on the direction of rotation followed by the reed switch 30'. As the reed switch 30' is lowered into the housing by the screw mechanism 50, the threshold leakage pressure required to actuate the reed switch is increased since the magnet in the sensing piston 26' must move a greater distance downwardly under the force of the leakage pressure differential across the diaphragm 42 to actuate the reed switch 30'. Likewise, upward threading of the screw 50 increases sensitivity and lowers the threshold pressure differential required to actuate the reed switch 30'.

Although the reed switch mechanism 50 is shown only in FIG. 2, the embodiment of FIG. 1 may employ a similar device, in which case the direction of reed switch movement for changes of sensitivity threshold would be opposite to those of the device of FIG. 2. This is so because the sensing piston 26 of FIG. 1 is normally urged downward by gravity whereas the sensing piston 26' of FIG. 2 is normally urged upwardly by the spring 46.

It will of course be apparent to those skilled in the art that other modifications may be made to the above-described embodiments without departing from the inventive concept inherent therein. For example, the simple open/closed reed switch arrangements shown in the above-described embodiments may be replaced by more complicated multi-pole switch arrangements to provide greater flexibility and variabiility of operation.

Likewise, the parallel main and secondary channels of the leak detector need not be built into a unitary housing. The two channels can be separately housed and thus connected into a system. Alternatively the secondary channel might be added to a main channel which is already connected in the system, or vice versa.

The scope of the invention therefore is not limited by this detailed description of these two embodiments, but rather is defined only by the following claims.

What is claimed is:

1. Means for detecting leaks in a closed fluid system comprising:
   means comprising an inlet and outlet, and parallel main and secondary channels connecting said inlet and outlet,
   sealing means in said main channel normally urged to prevent fluid flow in the main channel between said inlet and outlet, said sealing means being movable to permit such flow in response to a first threshold pressure differential between said inlet and outlet,
   a sensing element with magnetic flux movably positioned in said secondary channel from a first position to a second position in response to a second threshold pressure differential applied between said inlet and outlet passages, said second pressure differential threshold being less than said first pressure differential threshold, and
   switch means adjacent said magnetic flux when said sensing element is in one of said first and second positions, said switch means being responsive to said magnetic flux for indicating when the sensing element is in said one position whereby such element occupies such position whenever said second pressure differential threshold is exceeded, whereby leakage downstream of the outlet causes a pressure drop across said secondary channel sufficient to move the sensing element to its second position. such movement being detected by the switch means.

2. A fluid leak detector according to claim 1 wherein said sensing element comprises a piston with magnetic flux, said piston being normally urged into the other of said first and second positions by gravity and into said one position only when said second pressure differential threshold is exceeded.

3. A fluid leak detector according to claim 1 wherein said sensing element comprises a diaphragm means with magnetic flux, said diaphragm means being normally urged into the other of said first and second positions and into said one position only when said secondary pressure differential threshold is exceeded.

4. A fluid leak detector according to claim 3 further comprising resilient means urging said diaphragm means to the other of said first and second positions.

5. A fluid leak detector according to claim 1 further comprising means for moving said switch means in a direction substantially parallel to the direction of travel of said movable sensing element.

6. A fluid leak detector according to claim 1 wherein said switch means comprises a reed switch.

7. Means for detecting leaks in a closed fluid system comprising:
   a housing having an inlet and outlet for connection within such system,
   a main channel between said inlet and outlet in said housing having a valve means permitting flow therethrough only in response to a pressure drop across said main channel resulting from intentional opening of the system downstream of the outlet,
   a secondary channel between said inlet and outlet in said housing having a chamber and sensing element movably positioned in said chamber, said sensing element being moved from a first position to a second position by a pressure drop across said secondary channel resulting from leakage of the system downstream of the outlet, said sensing element being provided with magnetic flux such that said movement of the sensing element correspondingly moves such flux, and
   reed switch means positioned adjacent said sensing element for detecting the movement of the flux when said sensing element moves from its first position to its second position,
   whereby leakage downstream of the outlet causes a pressure drop across said secondary channel sufficient to move the sensing element to its second position, such movement being detected by the reed switch.

* * * * *